United States Patent
Markiewicz et al.

(10) Patent No.: US 10,481,791 B2
(45) Date of Patent: Nov. 19, 2019

(54) MAGNIFIED INPUT PANELS

(71) Applicant: Microsoft Technology Licensing, LLC, Redmond, WA (US)

(72) Inventors: Jan-Kristian Markiewicz, Redmond, WA (US); Robert J. Disano, Seattle, WA (US); Gregg R. Wygonik, Duvall, WA (US); Michael D. McCormack, Redmond, WA (US); Christian Klein, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/616,708

(22) Filed: Jun. 7, 2017

(65) Prior Publication Data

US 2018/0356975 A1    Dec. 13, 2018

(51) Int. Cl.
*G06F 3/0488* (2013.01)
*G06F 3/041* (2006.01)

(52) U.S. Cl.
CPC ........ *G06F 3/04886* (2013.01); *G06F 3/0412* (2013.01); *G06F 3/04883* (2013.01); *G06F 2203/04806* (2013.01)

(58) Field of Classification Search
CPC ........ G06F 3/041; G06F 3/042; G06F 3/0421; G06F 3/0423; G06F 3/0425; G06F 3/0426; G06F 3/0428; G06F 3/04886; G06F 3/0412
See application file for complete search history.

(56) References Cited

U.S. PATENT DOCUMENTS

| | | | | |
|---|---|---|---|---|
| 6,025,844 A | * | 2/2000 | Parsons | G06F 3/0481 715/805 |
| 7,810,021 B2 | * | 10/2010 | Paxson | G06F 17/2229 715/200 |
| 8,922,479 B2 | | 12/2014 | Penningto et al. | |
| 9,508,322 B2 | | 11/2016 | Thomas | |

(Continued)

FOREIGN PATENT DOCUMENTS

| | | |
|---|---|---|
| EP | 1564632 A2 | 8/2005 |
| EP | 2905686 A1 | 8/2015 |

OTHER PUBLICATIONS

Landau, Ted, "How Apple could improve typing on the iPad", http://www.macworld.com/article/2036449/how-apple-could-improve-typing-on-the-ipad.html, Published on: May 2, 2013, 11 pages.

(Continued)

*Primary Examiner* — William Lu
(74) *Attorney, Agent, or Firm* — International IP Law Group, PLLC

(57) ABSTRACT

A system for detecting input described herein can include a processor to augment a user interface to display a magnified input panel proximate a keyboard. The processor can also load a plurality of gesture functions associated with the magnified input panel and detect an input character corresponding to a source text field based on at least one keyboard selection from the keyboard. Additionally, the processor can display the input character in the magnified input panel and the source text field and generate a modified input character to be displayed in the magnified input panel and the source text field based on the input character and at least one gesture corresponding to the plurality of gesture functions.

20 Claims, 4 Drawing Sheets

(56) References Cited

U.S. PATENT DOCUMENTS

| | | | |
|---|---|---|---|
| 9,639,184 B2 | 5/2017 | Alonso Ruiz et al. | |
| 2008/0122796 A1* | 5/2008 | Jobs | G06F 3/0488 345/173 |
| 2008/0259039 A1* | 10/2008 | Kocienda | G06F 3/0238 345/173 |
| 2009/0284471 A1* | 11/2009 | Longe | G06F 3/0237 345/168 |
| 2011/0154246 A1* | 6/2011 | Oh | G06F 3/04886 715/773 |
| 2013/0111391 A1 | 5/2013 | Penner et al. | |
| 2013/0113717 A1* | 5/2013 | Van Eerd | G06F 3/04883 345/173 |
| 2013/0212515 A1* | 8/2013 | Eleftheriou | G06F 3/04883 715/773 |
| 2014/0033110 A1* | 1/2014 | Darden | G06F 3/0488 715/773 |
| 2014/0055381 A1* | 2/2014 | Kim | G06F 3/0236 345/173 |
| 2014/0157182 A1 | 6/2014 | Kim | |
| 2014/0184513 A1 | 7/2014 | Huang et al. | |
| 2014/0317547 A1* | 10/2014 | Bi | G06F 3/0482 715/773 |
| 2015/0177851 A1* | 6/2015 | Omprakash | G06F 3/0237 345/168 |
| 2015/0212707 A1 | 7/2015 | Norwood | |
| 2016/0139803 A1* | 5/2016 | Yan | G06F 3/0216 715/773 |
| 2016/0370967 A1 | 12/2016 | Zaman et al. | |
| 2017/0038958 A1* | 2/2017 | Walton | G06F 3/04883 |

OTHER PUBLICATIONS

"International Search Report and Written Opinion Issued in PCT Application No. PCT/US2018/033569", dated Jul. 26, 2018, 14 Pages.

* cited by examiner

300

MAGNIFIED INPUT PANELS

BACKGROUND

As mobile electronic devices include faster processors, additional memory, and additional components, the mobile electronic devices are used more frequently in place of traditional computing devices. Accordingly, users of the mobile electronic devices execute applications related to word processing, spreadsheet editing, and photo editing, among others. The size of the display screen of the mobile electronic devices can increase the amount of time for performing complex tasks through such applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for detecting input that includes a processor and a memory device coupled to the processor, the memory device to store instructions that, when executed by the processor, cause the processor to augment a user interface to display a magnified input panel proximate a keyboard. The processor can also load a plurality of gesture functions associated with the magnified input panel and detect an input character corresponding to a source text field based on at least one keyboard selection from the keyboard. Furthermore, the processor can display the input character in the source text field and generate a modified input character to be displayed in the magnified input panel and the source text field based on the input character and at least one gesture corresponding to the plurality of gesture functions.

In another embodiment described herein, a method for detecting input can include augmenting a user interface to display a magnified input panel proximate a keyboard and loading a plurality of gesture functions associated with the magnified input panel. The method can also include detecting an input character corresponding to a source text field based on at least one keyboard selection from the keyboard and displaying the input character in the magnified input panel and the source text field. Furthermore, the method can include generating a modified input character to be displayed in the magnified input panel and the source text field based on the input character and at least one gesture corresponding to the plurality of gesture functions.

In yet another embodiment described herein, one or more computer-readable storage devices for detecting input can include a plurality of instructions that, based at least on execution by a processor, cause the processor to augment a user interface to display a magnified input panel proximate a keyboard. The plurality of instructions can also cause the processor to load a plurality of gesture functions associated with the magnified input panel and detect an input character corresponding to a source text field based on at least one keyboard selection from the keyboard. Furthermore, the plurality of instructions can cause the processor to display the input character in the magnified input panel and the source text field and generate a modified input character to be displayed in the magnified input panel and the source text field based on the input character and at least one gesture corresponding to the plurality of gesture functions, wherein the at least one gesture comprises a directional swipe to modify an emphasis of a previously entered word.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Techniques described herein provide a system for detecting input with a magnified input panel. The magnified input panel can modify and magnify input characters to enable a user to more easily view and edit the input characters. For example, the magnified input panel can change characteristics of input characters to enable a user to more easily view the input characters. In some embodiments, the magnified input panel can be linked to any text field in a user interface of an application. In some embodiments, the magnified input panel can also display a magnified view of pre-existing text surrounding the input region or text field. In some examples, the magnified input panel can be displayed with a display device coupled to a mobile device, or any other suitable electronic device.

In some embodiments, a system for detecting input with a magnified input panel can include a processor to augment a user interface to display the magnified input panel proximate a keyboard. In some examples, the processor can also load a plurality of gesture functions associated with the magnified input panel and detect an input character corresponding to a source text field based on at least one keyboard selection from the keyboard. Furthermore, in some embodiments, the processor can display the input character in the magnified input panel and the source text field. Moreover, in some embodiments, the processor can generate a modified input character to be displayed in the magnified input panel and the source text field based on the input character and at least one gesture corresponding to the plurality of gesture functions. The techniques described herein enable a user to edit text in a source text field faster and more efficiently by recognizing and applying editing commands based on pre-defined gestures.

Figure 1:
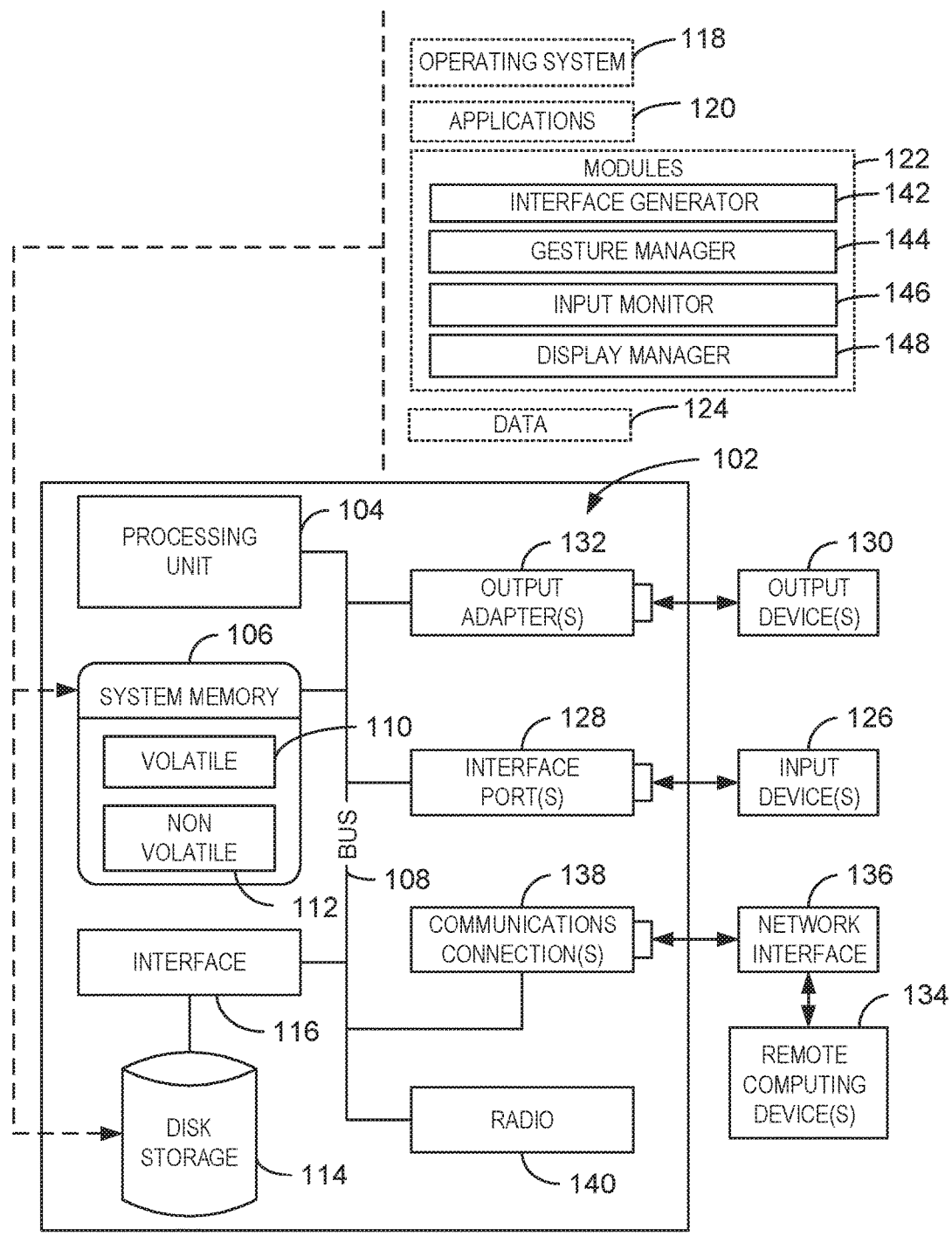
FIG. 1 is a block diagram of an example of a computing system that can detect input with a magnified input panel.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can detect input with a magnified input panel. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as an interface generator 142, a gesture manager 144, an input monitor 146, and a display manager 148. In some embodiments, the interface generator 142 can augment a user interface to display a magnified input panel proximate a keyboard. In some examples, the gesture manager 144 can load a plurality of gesture functions associated with the magnified input panel. In some embodiments, the input monitor 146 can detect an input character corresponding to a source text field based on at least one keyboard selection from the keyboard. In some embodiments, the display manager 148 can display the input character in the magnified input panel and the source text field. In some examples, the display manager 148 can also generate a modified input character to be displayed in the magnified input panel and the source text field based on the input character and at least one gesture corresponding to the plurality of gesture functions. In some embodiments, the display manager 148 can display a modified input character in the magnified input panel without detecting a gesture. For example, the display manager 148 can change the appearance of text displayed in the magnified input panel by modifying a scale of the text, a contrast of the text, or a color of the text, among others.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the interface generator 142, gesture manager 144, input monitor 146, and display manager 148 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
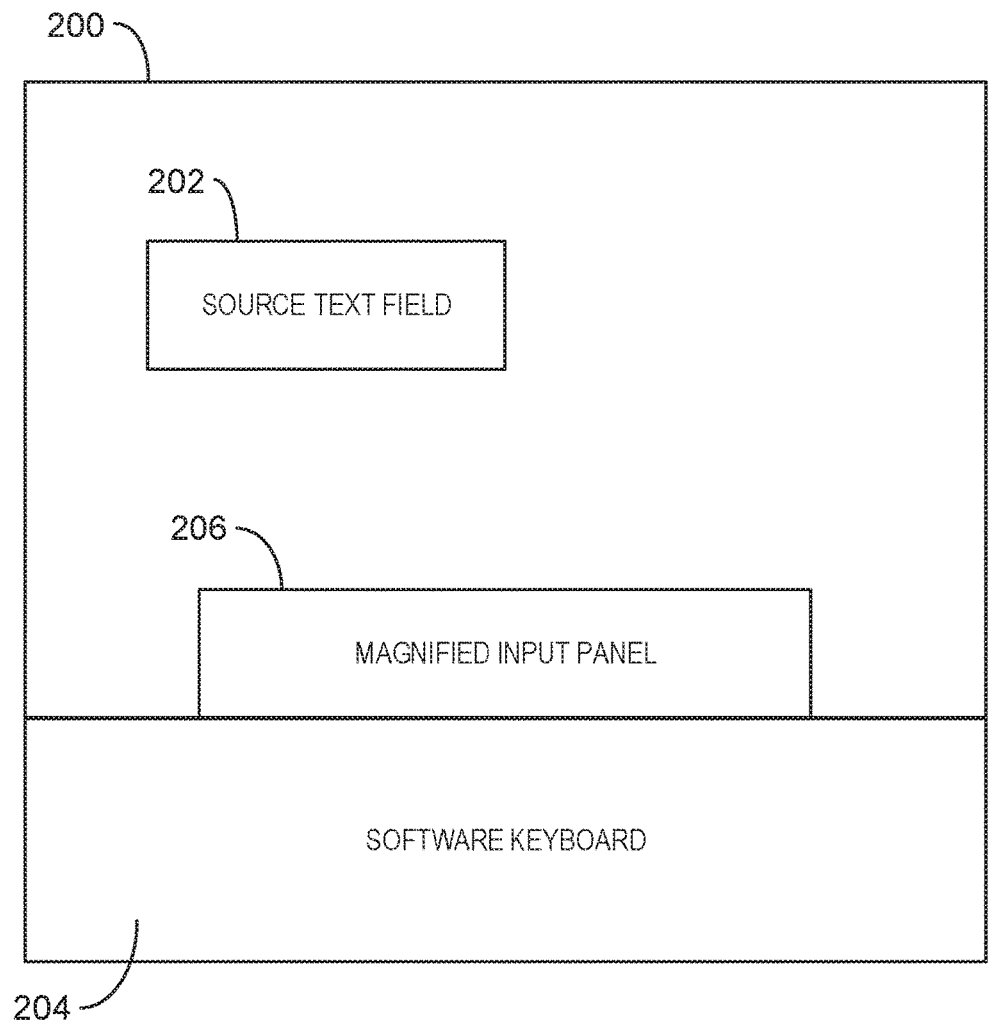
FIG. 2 is a diagram illustrating a user interface for detecting input with a magnified input panel.

FIG. 2 is a diagram illustrating a user interface for detecting input with a magnified input panel. In some embodiments, user interface 200 can include any suitable number of control elements such as text fields, labels, buttons, check boxes, and the like. The control elements can enable users to provide any suitable input. In some examples, the user interface 200 can include a source text field 202 that can detect user input corresponding to the user interface 200. For example, the source text field 202 can detect input characters from a software keyboard or a hardware keyboard. In some embodiments, the software keyboard 204 can be displayed within any suitable portion of the user interface 200. For example, the software keyboard 204 can be displayed at the bottom of the user interface 200, a side of the user interface 200, or any other suitable portion of the user interface 200.

In some embodiments, the source text field 202 can be displayed proximate any number of control elements. A magnified input panel 206 can be displayed within a software keyboard 204, adjacent to a software keyboard 204, within a hardware keyboard, or adjacent to a hardware keyboard. The magnified input panel 206 can be linked to the source text field 202 so that any input characters entered into either the magnified input panel 206 or the source text field 202 are displayed in both locations. The magnified input panel 206 can display text entered into the source text field 202 with a larger font, a predetermined font that corresponds to easy to read text, and the like. In some embodiments, the magnified input panel 206 can support or recognize a library of gestures (also referred to herein as a plurality of gesture functions) not supported or recognized by an application corresponding to the source text field 202. For example, the library of gestures can include any number of input editing gestures that can change the emphasis of an input character, change the font of an input character, change background characteristics of the input character, and the like. The library of gestures is described in greater detail below in relation to FIG. 3.

In some embodiments, the user interface 200 can hide the magnified input panel 206 in response to detecting that the source text field 202 no longer has input focus. In some examples, the user interface 200 can display an icon to display the magnified input panel 206, wherein the icon can be displayed within a software keyboard 204, adjacent to a hardware keyboard, adjacent to a source text field 202, or in any suitable location within the user interface 200.

It is to be understood that the block diagram of FIG. 2 is not intended to indicate that the user interface 200 is to include all of the components shown in FIG. 2. Rather, user interface 200 can include fewer or additional components not illustrated in FIG. 2.

Figure 3:
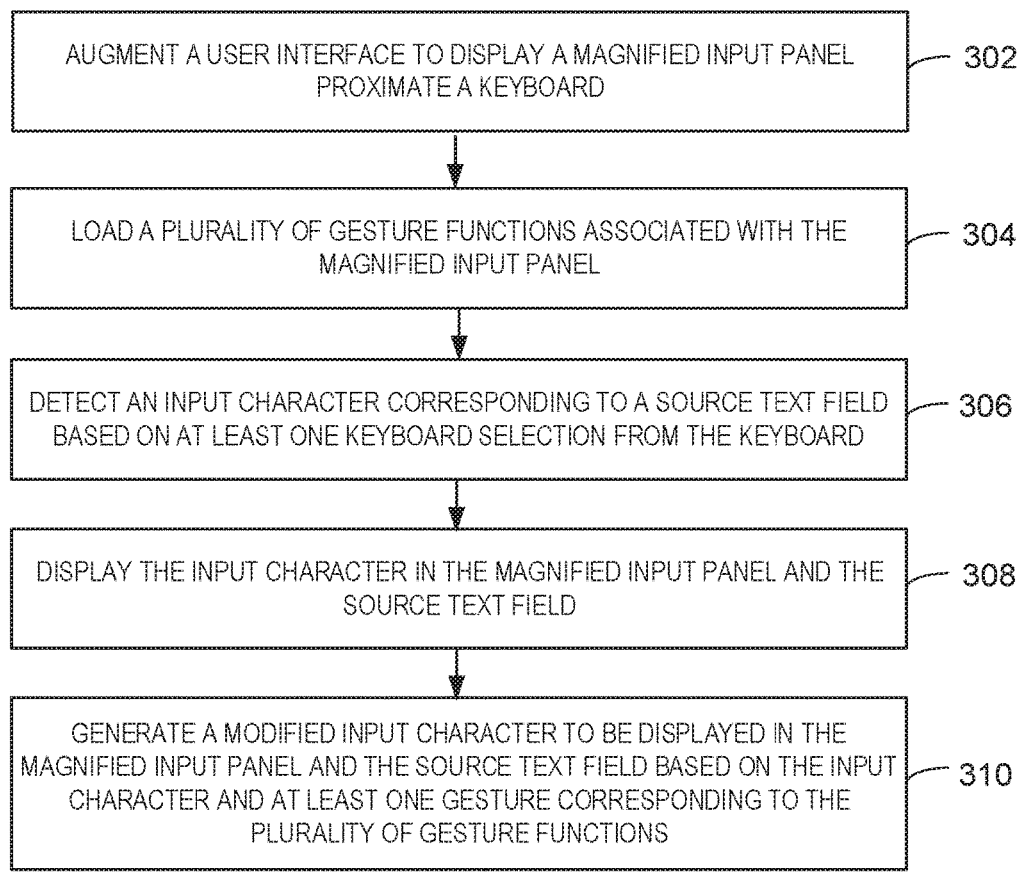
FIG. 3 is a process flow diagram of an example method for detecting input with a magnified input panel.

FIG. 3 is a process flow diagram of an example method for detecting input with a magnified input panel. The method 300 can be implemented with any suitable computing device, such as the computing system 102 of FIG. 1.

At block 302, an interface generator 142 can augment a user interface to display a magnified input panel proximate a keyboard. In some embodiments, the interface generator 142 can display a magnified input panel proximate a software keyboard, embed the magnified input panel within a software keyboard, or display the magnified input panel proximate a hardware keyboard. In some examples, the magnified input panel can show a region of the user interface that corresponds to a source text field displayed in the user interface. For example, the magnified input panel may show a region of the user interface corresponding to a source text field displayed in a web page, spreadsheet, text document, or any other suitable document or application. In some embodiments, the interface generator 142 can display the magnified input panel over content of a user interface or the magnified input panel can have any suitable configurable opaqueness setting.

At block 304, a gesture manager 144 can load a plurality of gesture functions associated with the magnified input panel. In some examples, the plurality of gesture functions correspond to a library of gestures that are supported within the magnified input panel, but are not supported in the source text field or other regions of the user interface. In some embodiments, the gesture functions can include a directional swipe to delete a previously entered string of characters also referred to herein as a word. In one example, a magnitude of a swipe or gesture can indicate a number of input characters to be deleted. For example, a larger swipe can delete several words or strings of input characters, while a smaller swipe may delete fewer input characters. In some examples, the gesture functions can also include a single tap and hold to drag an input character to a different location in the magnified input panel. In some embodiments, the gesture functions can also include a directional swipe to modify an emphasis of a previously entered word or string of characters, wherein the emphasis can include a bold setting, an underlined setting, an italicized setting, a font color setting, or a font size setting, among others.

In some embodiments, the gesture functions can include a directional swipe to replace a previously entered word or string of characters with a corresponding image. In some examples, the gesture functions can include a second gesture to move the corresponding image within the magnified input panel in relation to additional text or input characters. In some embodiments, a gesture can include single tap text cursor or caret placement within the magnified input panel. In some embodiments, the gesture function can also include expanding an abbreviation entered into the magnified input panel.

At block 306, an input monitor 146 can detect an input character corresponding to a source text field based on at least one keyboard selection from the keyboard. For example, a source text field can be displayed in a user interface corresponding to any suitable application such as a word processing application, a spreadsheet application, a photo editing application, and the like. In some embodiments, the input monitor 146 can detect an input character corresponding to the source text field. The input monitor 146 can detect the input character from a hardware keyboard or a selection from a software keyboard displayed on a touch screen display panel. In some embodiments, the input monitor 146 can detect any suitable number of input characters.

At block 308, a display manager 148 can display the input character in the magnified input panel and the source text field. For example, the display manager 148 can maintain a two way link between the magnified input panel and the source text field. Accordingly, a change to the input character in either the magnified input panel or the source text field can be displayed in both locations. In some embodiments, the two way link between the magnified input panel and the source text field can be maintained with any suitable data structure such as a linked list, array, vector, and the like. In some examples, the display manager 148 can store pointers corresponding to memory addresses that store the input characters displayed in the source text field or the magnified input panel. In some embodiments, based on the two way link between the magnified input panel and the source text field, a horizontal gesture in the source text field can result in a scrolling action within the magnified input panel.

At block 310, the display manager 148 can also generate a modified input character to be displayed in the magnified input panel and the source text field based on the input character and at least one gesture corresponding to the plurality of gesture functions. In some examples, the display manager 148 can generate a modified input character based on any combination of gestures described above in relation to block 304. In some embodiments, the display manager 148 can detect a shorthand gesture and apply the shorthand gesture to the input character to generate the modified input character. In some examples, the shorthand can result in replacing a word with any suitable image, expanding an abbreviation to a full term, changing the emphasis of a character or word, deleting a character or a word, changing a color or font for a word, and the like. In some embodiments, the shorthand gesture can enable an expansion or compression of any string of input characters. For example, the shorthand gesture can enable any suitable number of predetermined consecutive input characters to be expanded to a predetermined expanded list of input characters. For example, a shorthand gesture can enable non-standard abbreviations, such as "xyz," to be expanded into any suitable predetermined string of characters or words such as "plurality," or any other suitable word or number of words.

In some examples, the display manager 148 can also modify a saturation, chroma, or a hue of the input character to be displayed in the magnified input panel. The display manager 148 can also modify a saturation, chroma, or a hue of the background for an input character to be displayed in the magnified input panel. In some embodiments, the display manager 148 can also modify a font or font size of the input character, wherein the font can include a fixed width font. The display manager 148 can select a saturation value, hue value, font, or any combination thereof to increase the readability of input characters entered into the magnified input panel. For example, the saturation value, hue value, font type, and font size can increase a contrast between displayed input characters in the magnified input panel and a background of the magnified input panel.

In some embodiments, the display manager 148 can automatically track the insertion point for an input character in the magnified input panel and any focus changes between text fields. In some examples, moving between text fields (e.g. by pressing the tab key, or by tapping on a new field with touch or another input modality) automatically updates the view of the magnified input panel to re-center the magnified input panel on a new insertion point location. Similarly, the view of a magnified panel can update when a user moves an insertion point within a particular text field, which may occur when explicitly moving the insertion point (e.g. by tapping in a location within the edit field) or as a side-effect of entering or deleting text.

In one embodiment, the process flow diagram of FIG. 3 is intended to indicate that the blocks of the method 300 are to be executed in a particular order. Alternatively, in other embodiments, the blocks of the method 300 can be executed in any suitable order and any suitable number of the blocks of the method 300 can be included. Further, any number of additional blocks may be included within the method 300, depending on the specific application. In some embodiments, the method 300 can include detecting a gesture within the magnified input panel that corresponds to an editing function such as a cut and paste function or a copy function. The method 300 can also include detecting the input character has been previously modified with additional gestures and providing the modified input character to the gesture corresponding to the editing function. In some embodiments, the method 300 can include detecting a selection of a magnified input panel icon, wherein the selection can expand or hide the magnified input panel.

Figure 4:
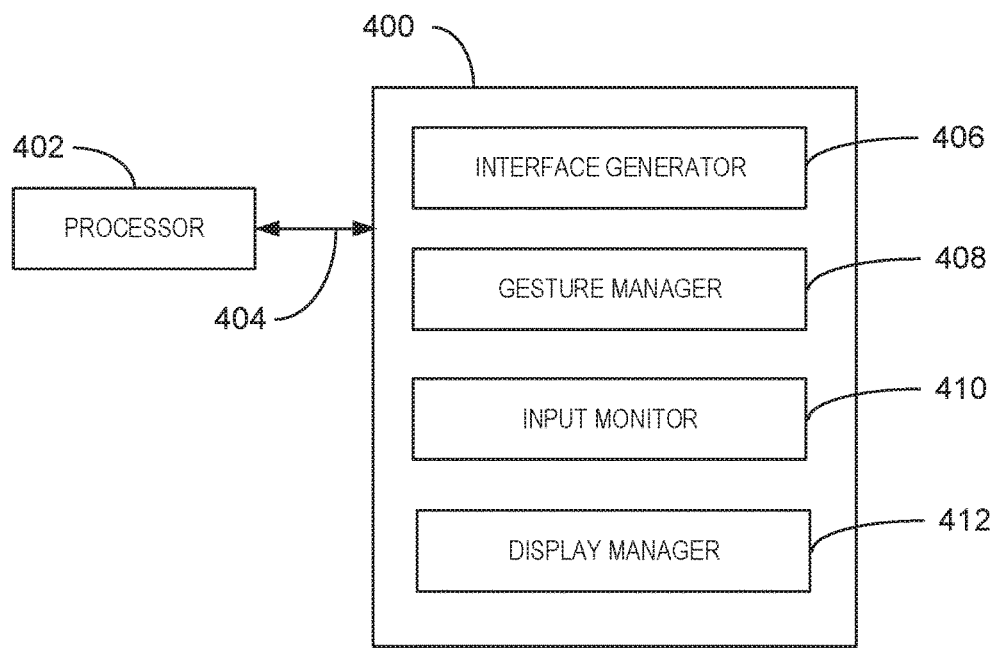
FIG. 4 is a block diagram of an example computer-readable storage media that can detect input with a magnified input panel.

FIG. 4 is a block diagram of an example computer-readable storage media that can detect input with a magnified input panel. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include an interface generator 406 can augment a user interface to display a magnified input panel proximate a keyboard. In some examples, a gesture manager 408 can load a plurality of gesture functions associated with the magnified input panel. In some embodiments, an input monitor 410 can detect an input character corresponding to a source text field based on at least one keyboard selection from the keyboard. In some embodiments, a display manager 412 can display the input character in the magnified input panel and the source text field. In some examples, the display manager 412 can also generate a modified input character to be displayed in the magnified input panel and the source text field based on the input character and at least one gesture corresponding to the plurality of gesture functions.

It is to be understood that any number of additional software components not shown in FIG. 4 may be included within the tangible, computer-readable storage media 400, depending on the specific application.

Example 1

In one embodiment, a system for detecting input includes a processor and a memory device coupled to the processor, the memory device to store instructions that, when executed by the processor, cause the processor to augment a user interface to display a magnified input panel proximate a keyboard. The processor can also load a plurality of gesture functions associated with the magnified input panel and detect an input character corresponding to a source text field based on at least one keyboard selection from the keyboard. Furthermore, the processor can display the input character in the source text field and generate a modified input character to be displayed in the magnified input panel and the source text field based on the input character and at least one gesture corresponding to the plurality of gesture functions.

Alternatively, or in addition, the processor can detect a selection of a magnified input panel icon. Alternatively, or in addition, the keyboard can be a software keyboard or a hardware keyboard coupled to the system. Alternatively, or in addition, the at least one gesture can include a directional swipe to delete a previously entered word. Alternatively, or in addition, the at least one gesture can include a single tap and hold to drag the input character and a plurality of additional input characters to a different location in the magnified input panel. Alternatively, or in addition, the at least one gesture can include a directional swipe to modify an emphasis of a previously entered word, the emphasis comprising a bold setting, an underlined setting, an italicized setting, a font color setting, or a font size setting. Alternatively, or in addition, the at least one gesture can include replacing a previously entered word with a corresponding image. Alternatively, or in addition, the processor can detect a second gesture to move the corresponding image within the magnified input panel. Alternatively, or in addition, the processor can maintain a two way link between the magnified input panel and the source text field. Alternatively, or in addition, the at least one gesture can include expanding an abbreviation entered into the magnified input panel. Alternatively, or in addition, the processor can modify a saturation or a hue of the input character to be displayed in the magnified input panel. Alternatively, or in addition, the processor can modify a font of the input character to a fixed width font to be displayed in the magnified input panel. Alternatively, or in addition, the processor can detect a single tap caret placement within the magnified input panel. Alternatively, or in addition, the processor can detect a shorthand gesture and apply the shorthand gesture to the input character to generate the modified input character.

Example 2

In another embodiment described herein, a method for detecting input can include augmenting a user interface to display a magnified input panel proximate a keyboard and loading a plurality of gesture functions associated with the magnified input panel. The method can also include detecting an input character corresponding to a source text field based on at least one keyboard selection from the keyboard and displaying the input character in the magnified input panel and the source text field. Furthermore, the method can include generating a modified input character to be displayed in the magnified input panel and the source text field based on the input character and at least one gesture corresponding to the plurality of gesture functions.

Alternatively, or in addition, the method can include detecting a selection of a magnified input panel icon. Alternatively, or in addition, the keyboard can be a software keyboard or a hardware keyboard coupled to the system. Alternatively, or in addition, the at least one gesture can include a directional swipe to delete a previously entered word. Alternatively, or in addition, the at least one gesture can include a single tap and hold to drag the input character and a plurality of additional input characters to a different location in the magnified input panel. Alternatively, or in addition, the at least one gesture can include a directional swipe to modify an emphasis of a previously entered word, the emphasis comprising a bold setting, an underlined setting, an italicized setting, a font color setting, or a font size setting. Alternatively, or in addition, the at least one gesture can include replacing a previously entered word with a corresponding image. Alternatively, or in addition, the method can include detecting a second gesture to move the corresponding image within the magnified input panel. Alternatively, or in addition, the method can include maintaining a two way link between the magnified input panel and the source text field. Alternatively, or in addition, the at least one gesture can include expanding an abbreviation entered into the magnified input panel. Alternatively, or in addition, the method can include modifying a saturation or a hue of the input character to be displayed in the magnified input panel. Alternatively, or in addition, the method can include modifying a font of the input character to a fixed width font to be displayed in the magnified input panel. Alternatively, or in addition, the method can include detecting a single tap caret placement within the magnified input panel. Alternatively, or in addition, the method can include detecting a shorthand gesture and applying the shorthand gesture to the input character to generate the modified input character.

Example 3

In yet another embodiment described herein, one or more computer-readable storage devices for detecting input can include a plurality of instructions that, based at least on execution by a processor, cause the processor to augment a user interface to display a magnified input panel proximate a keyboard. The plurality of instructions can also cause the processor to load a plurality of gesture functions associated with the magnified input panel and detect an input character corresponding to a source text field based on at least one keyboard selection from the keyboard. Furthermore, the plurality of instructions can cause the processor to display the input character in the magnified input panel and the source text field and generate a modified input character to be displayed in the magnified input panel and the source text field based on the input character and at least one gesture corresponding to the plurality of gesture functions, wherein the at least one gesture comprises a directional swipe to modify an emphasis of a previously entered word.

Alternatively, or in addition, the plurality of instructions can cause the processor to detect a selection of a magnified input panel icon. Alternatively, or in addition, the keyboard can be a software keyboard or a hardware keyboard coupled to the system. Alternatively, or in addition, the at least one gesture can include a directional swipe to delete a previously entered word. Alternatively, or in addition, the at least one gesture can include a single tap and hold to drag the input character and a plurality of additional input characters to a different location in the magnified input panel. Alternatively, or in addition, the at least one gesture can include a directional swipe to modify an emphasis of a previously entered word, the emphasis comprising a bold setting, an underlined setting, an italicized setting, a font color setting, or a font size setting. Alternatively, or in addition, the at least one gesture can include replacing a previously entered word with a corresponding image. Alternatively, or in addition, the plurality of instructions can cause the processor to detect a second gesture to move the corresponding image within the magnified input panel. Alternatively, or in addition, the plurality of instructions can cause the processor to maintain a two way link between the magnified input panel and the source text field. Alternatively, or in addition, the at least one gesture can include expanding an abbreviation entered into the magnified input panel. Alternatively, or in addition, the plurality of instructions can cause the processor to modify a saturation or a hue of the input character to be displayed in the magnified input panel. Alternatively, or in addition, the plurality of instructions can cause the processor to modify a font of the input character to a fixed width font to be displayed in the magnified input panel. Alternatively, or in addition, the plurality of instructions can cause the processor to detect a single tap caret placement within the magnified input panel. Alternatively, or in addition, the plurality of instructions can cause the processor to detect a shorthand gesture and apply the shorthand gesture to the input character to generate the modified input character.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for detecting input, comprising:
   a processor; and
   a memory device coupled to the processor, the memory device to store instructions that, when executed by the processor, cause the processor to:
   augment a user interface to display a magnified input panel proximate a keyboard;
   load a plurality of gesture functions associated with the magnified input panel;
   detect an input character corresponding to a source text field based on at least one keyboard selection from the keyboard;
   display the input character in the source text field; and
   generate a modified input character to be displayed in the magnified input panel, wherein the modified input character comprises an expansion of a predetermined list of consecutive characters to a predetermined expanded list of characters, and the source text field based on the input character and at least one gesture corresponding to the plurality of gesture functions, the magnified input panel to have a two way link to the source text field, the two way link to enable the modified input character to be displayed in both the magnified input panel and the source text field.

2. The system of claim 1, wherein the processor is to detect a selection of a magnified input panel icon.

3. The system of claim 1, wherein the keyboard is a software keyboard or a hardware keyboard coupled to the system.

4. The system of claim 1, wherein the at least one gesture comprises a directional swipe to delete a previously entered word.

5. The system of claim 1, wherein the at least one gesture comprises a single tap and hold to drag the input character and a plurality of additional input characters to a different location in the magnified input panel.

6. The system of claim 1, wherein the at least one gesture comprises a directional swipe to modify an emphasis of a previously entered word, the emphasis comprising a bold setting, an underlined setting, an italicized setting, a font color setting, or a font size setting.

7. The system of claim 1, wherein the processor is to detect a second gesture to move the image within the magnified input panel.

8. The system of claim 1, wherein the processor is to maintain a two way link between the magnified input panel and the source text field.

9. The system of claim 1, wherein the at least one gesture comprises expanding an abbreviation entered into the magnified input panel.

10. The system of claim 1, wherein the processor is to modify a saturation or a hue of the input character to be displayed in the magnified input panel.

11. The system of claim 1, wherein the processor is to modify a font of the input character to a fixed width font to be displayed in the magnified input panel.

12. The system of claim 1, wherein the processor is to detect a single tap caret placement within the magnified input panel.

13. The system of claim 1, wherein the processor is to detect a shorthand gesture and apply the shorthand gesture to the input character to generate the modified input character.

14. A method for detecting input, comprising:
    augmenting a user interface to display a magnified input panel proximate a keyboard;
    loading a plurality of gesture functions associated with the magnified input panel;
    detecting an input character corresponding to a source text field based on at least one keyboard selection from the keyboard;

displaying the input character in the magnified input panel and the source text field; and generating a modified input character to be displayed in the magnified input panel, wherein the modified input character comprises an expansion of a predetermined list of consecutive characters to a predetermined expanded list of characters, and the source text field based on the input character and at least one gesture corresponding to the plurality of gesture functions, the magnified input panel to have a two way link to the source text field, the two way link to enable the modified input character to be displayed in both the magnified input panel and the source text field.

15. The method of claim 14, wherein the keyboard is a software keyboard or a hardware keyboard coupled to the system.

16. The method of claim 14, wherein the at least one gesture comprises a directional swipe to delete a previously entered word.

17. The method of claim 14, wherein the at least one gesture comprises a single tap and hold to drag the input character and a plurality of additional input characters to a different location in the magnified input panel.

18. The method of claim 14, wherein the at least one gesture comprises a directional swipe to modify an emphasis of a previously entered word, the emphasis comprising a bold setting, an underlined setting, an italicized setting, a font color setting, or a font size setting.

19. One or more computer-readable storage media comprising a plurality of instructions that, in response to being executed by a processor, cause the processor to:

augment a user interface to display a magnified input panel proximate a keyboard;

load a plurality of gesture functions associated with the magnified input panel;

detect an input character corresponding to a source text field based on at least one keyboard selection from the keyboard;

display the input character in the magnified input panel and the source text field; and generate a modified input character, wherein the modified input character comprises an image that replaces a word, to be displayed in the magnified input panel and the source text field based on the input character and at least one gesture corresponding to the plurality of gesture functions, the magnified input panel to have a two way link to the source text field, the two way link to enable the modified input character to be displayed in both the magnified input panel and the source text field.

20. The system of claim 1, wherein the magnified input panel corresponds to a spreadsheet or a web page.

* * * * *